(12) United States Patent
Labrozzi et al.

(10) Patent No.: US 11,190,826 B1
(45) Date of Patent: Nov. 30, 2021

(54) SEGMENT QUALITY-GUIDED ADAPTIVE STREAM CREATION

(71) Applicant: Disney Enterprises, Inc., Burbank, CA (US)

(72) Inventors: Scott C. Labrozzi, Cary, NC (US); Chetan K. Mathur, Apex, NC (US); Yuanyi Xue, Kensington, CA (US); Michael J. Bracco, Raleigh, NC (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/911,641

(22) Filed: Jun. 25, 2020

(51) Int. Cl.
*H04L 29/06* (2006.01)
*H04L 29/08* (2006.01)
*H04N 21/2662* (2011.01)

(52) U.S. Cl.
CPC ....... *H04N 21/2662* (2013.01); *H04L 65/601* (2013.01); *H04L 65/607* (2013.01); *H04L 65/80* (2013.01)

(58) Field of Classification Search
CPC . H04N 21/2662; H04L 65/601; H04L 65/607; H04L 65/80
USPC .......................................................... 709/219
See application file for complete search history.

(56) References Cited

U.S. PATENT DOCUMENTS

| | | | |
|---|---|---|---|
| 10,623,787 B1 | 4/2020 | Nielsen et al. | |
| 10,735,739 B2* | 8/2020 | Mao | H04N 19/463 |
| 10,893,310 B1* | 1/2021 | Wu | H04N 21/6373 |
| 10,958,947 B1* | 3/2021 | Wei | H04N 21/2402 |
| 2013/0179589 A1 | 7/2013 | McCarthy et al. | |
| 2016/0295216 A1 | 10/2016 | Aaron et al. | |
| 2019/0028529 A1* | 1/2019 | Katsavounidis | H04N 19/132 |
| 2019/0028745 A1* | 1/2019 | Katsavounidis | H04N 21/23805 |
| 2019/0289296 A1* | 9/2019 | Kottke | H04N 19/179 |
| 2019/0327510 A1 | 10/2019 | Kalagi et al. | |

(Continued)

FOREIGN PATENT DOCUMENTS

EP    3451672 A1    3/2019

OTHER PUBLICATIONS

De Cock Jan et al., "Complexity-Based Consistent-Quality Encoding in the Cloud," 2016 IEEE Interntional Conference an Image Processing (ICIP), IEEE, dated Sep. 25, 2016, pp. 1484-1488.

(Continued)

*Primary Examiner* — Ruolei Zong
(74) *Attorney, Agent, or Firm* — Patterson + Sheridan, LLP

(57) ABSTRACT

Embodiments provide for improved stream generation are provided. A video comprising a plurality of segments and an encoding ladder specifying a plurality of maximum average bitrates (MABs) are received. A plurality of intermediate bitrates interspersed among the plurality of MABs are selected. A target average bitrate (TAB) segment is generated by encoding a first segment using a first MAB, and a first intermediate average bitrate (IAB) segment is generated by encoding the first segment using a first intermediate bitrate. Quality scores are generated for the first TAB segment and the first IAB segment. A first output segment is selected for the first segment at the first MAB based on the quality scores, where the first output segment is either the first TAB segment or the first IAB segment. Upon receiving a request for the first segment at the first MAB, the first output segment is outputted.

20 Claims, 10 Drawing Sheets

(56) References Cited

U.S. PATENT DOCUMENTS

2020/0099733 A1\* 3/2020 Chu ................. H04L 65/605
2020/0296362 A1\* 9/2020 Chadwick ............ G06K 9/4628

OTHER PUBLICATIONS

European Patent Office, Extended European Search Report for Application 21177575.4 dated Sep. 13, 2021.

\* cited by examiner

SEGMENT QUALITY-GUIDED ADAPTIVE STREAM CREATION

BACKGROUND

Streaming services (e.g., video streams, audio streams, or multimedia streams) have become increasingly common and desired by a wide variety of users. Streaming content enables users to receive the multimedia they desire at the time they desire/need it, rather than downloading it ahead of time. That is, rather than force users to wait long periods of time for large downloads (e.g., an entire movie), which also forces users to store large amounts of data, streaming enables the user to fetch smaller segments of a larger video on an as-needed basis (e.g., just before the segment begins).

To improve streaming services, Adaptive Bitrate Streaming (ABR) has been developed. ABR is predicated on providing multiple streams (often referred to as variants) at varying bitrates, enabling clients to dynamically select variants based on network conditions and other factors. These variants are encoded using an encoding ladder with a number of rungs, each rung corresponding to a desired output bitrate. Often, multiple resolutions (e.g., 1920×1080, 1280×720, and the like) can coexist on an encoding ladder, with a given resolution at one or more consecutive rungs. The ABR streams are segmented (e.g., split into discrete sub-assets, usually a few seconds long each), and clients can adapt from one variant to another at segment boundaries, as network conditions change.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
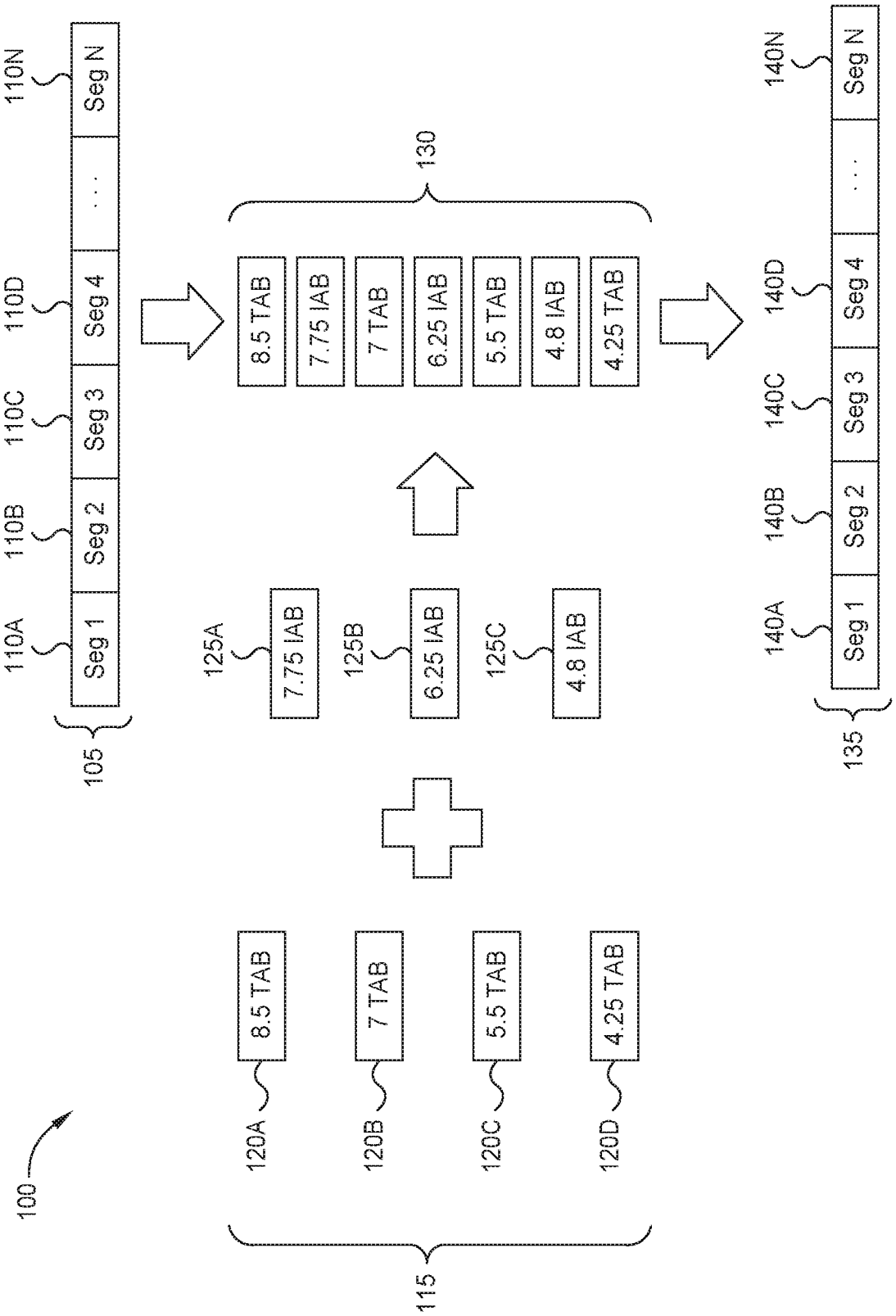
FIG. 1 depicts a system configured to perform segment quality-guided adaptive stream creation, according to some embodiments disclosed herein.

Embodiments of the present disclosure provide techniques for segment quality-guided adaptive (SQA) stream generation. The SQA system enables reduced resource usage, including lower storage requirements and reduced network bandwidth needed to transmit the SQA stream. A significant challenge in existing ABR applications is selecting an appropriate ABR encoding ladder. The encoding stack or ladder refers to a set of variants/bitrates, where each bitrate corresponds to a step or rung on the ladder, with the highest bitrate at the top of the ladder and the lowest bitrate at the bottom. However, differing content can involve significantly differing encoding needs and complications.

A given encoding ladder targeting outputs as defined by its rungs (e.g., resolutions or bitrates) can easily produce more bits than are necessary for some content. For example, an 8.5 Megabit per second (Mb/s) stream is appropriate for live action video, but excessive for simple animations. A more constrained ladder (e.g., with lower bitrates, lower resolution, or both) may be sufficient for such simple animations, but is likely to be insufficient to produce sufficient quality with some content (e.g., live action). In choosing an encoding ladder, existing systems are often forced to choose between existing ladders, where some produce sufficient quality but wasted bits and others produces more conservative bits but at less than desired quality. Some attempts to mitigate these concerns have involved title-based ABR encoding, where each title (e.g., each video source) can potentially have its own encoding stack.

However, not only is each content asset (title) often different from the others, but variations can occur within a single asset, which reduces the efficacy of selecting a single predefined ladder. Without adaptive encoding ladders, the system again must either select a ladder that is sufficient to produce the desired quality when needed within the asset but that produces wasted (unnecessary) bits when not needed, or a second ladder that is optimal for much of the asset, but is insufficient for some portions. Many existing systems select the higher bitrate ladder which results in over-producing bits in order to ensure high video quality. However, this choice results in wasted costs for the provider (including storage and delivery of the unneeded data), as well as added customer costs (including increased data consumption, which is particularly harmful when the user is on a metered data plan). Further, this approach can impact the quality of experience, such as by forcing a higher frequency of re-buffering, longer download times, and the like.

While some ABR format protocols allow for dynamic ladder changes within an asset, many do not. Embodiments of the present disclosure provide techniques to provide dynamic intra-title ladders that are protocol format agnostic. For example, in some embodiments, client devices can be presented with a set of bitrate options (e.g., an 8.5 Mb/s stream, a 7 Mb/s stream, a 5.5 Mb/s stream, and so on). In various embodiments, the client device may automatically select between streams as conditions change, or a user may manually select a particular stream. Embodiments of the present disclosure enable the provider system to dynamically switch to lower bitrate streams when doing so will not harm the user experience (e.g., when the segment quality would not suffer), which reduces network load and storage requirements. Notably, in some embodiments, the system dynamically selects differing bitrate streams within each resolution. That is, the decision to select a lower-bitrate segment may be performed on a per-resolution basis. In such an embodiment, the system selects among lower-bitrate segments with the same resolution as the original segment/stream (e.g., a 720p segment will not be selected for a 1080p stream).

FIG. 1 depicts a system 100 configured to perform segment quality-guided adaptive stream creation, according to some embodiments disclosed herein. In the illustrated embodiment, a media Asset 105 can be provided. The Asset 105 may include any media, such as audio, video, and multimedia including both video and audio. In the illustrated embodiment, the Asset 105 is delineated into a sequence of Segments 110A-N. This segmentation may be performed using any number of techniques. Generally, each Segment 110A-N is a portion or section of the Asset 105, and the Segments 110A-N are associated with an order or sequence. In this way, by sequentially receiving the Segments 110A-N, the entire Asset 105 can be received.

In the illustrated embodiment, an initial Encoding Ladder 115 is depicted. The Encoding Ladder 115 includes four Rungs 120A-D, each associated with a respective target average bitrate (TAB). Although four Rungs 120 are depicted, in embodiments, the Encoding Ladder 115 may include any number of rungs/bitrates. In the illustrated embodiment, the first Rung 120A corresponds to an 8.5 Mb/s TAB, the Rung 120B corresponds to a 7 Mb/s TAB, the Rung 120C corresponds to a 5.5 Mb/s TAB, and the Rung 120D corresponds to a 4.25 Mb/s TAB.

In existing systems, the Encoding Ladder 115 is used to encode each Segment 110 of the Asset 105. That is, each Segment 110 is encoded at the bitrate specified by each Rung 120 of the Encoding Ladder 115. Thus, existing systems generate four separate output sequences, one for each TAB, each with a sequence of segments encoded at the corresponding TAB. Clients can then indicate their maximum average bitrate (MAB), which is used to select one of the four streams. For example, if the client requests an 8.5 Mb/s MAB, existing systems provide the stream encoded at 8.5 Mb/s (that is, every Segment 110 in the stream is encoded at 8.5 Mb/s). Similarly, if the client requests a 7 Mb/s MAB, existing systems provide the stream encoded at 7 Mb/s. This results in some Segments 110 being transmitted with unnecessary/extra bits.

In the illustrated embodiment, the existing Encoding Ladder 115 is supplemented with a set of intermediate average bitrates (IABs), illustrated using Rungs 125A-C. In the illustrated embodiment, each new Rung 125A-C is inserted between two existing Rungs 120A-D. In various embodiments, there may be any number of variety of IAB Rungs 125. For example, there may be two or more IAB rungs between existing TAB rungs, or there may be zero IAB rungs between two given TAB rungs. Additionally, in embodiments, the system may utilize zero or more IAB rungs below the lowest-bitrate TAB. In some embodiments, the IABs are selected to evenly divide the gap(s) between the existing TABs. As illustrated, combining the existing Encoding Ladder 115 with additional IAB Rungs 125 yields an Augmented Encoding Ladder 130, which has extra rungs. Further, in some embodiments, the MABs/TABs/IABs are defined on a per-resolution basis. That is, each available resolution of video may have an associated set of MABs, TAB segments, and IAB segments. For example, there may be one or more IABs above the highest TAB for the 720p resolution, because these higher IABs are part of the existing 1080p resolution set.

As illustrated, this Augmented Encoding Ladder 130 can be used to generate one or more Output Streams 135 comprising a sequence of Encoded Segments 140A-N. In embodiments of the present disclosure, the system 100 allows each Output Stream 135 to include Encoded Segments 140A-N encoded at differing bitrates. That is, while existing systems force each segment in a given stream to be encoded with the same bitrate, the Output Stream 135 can vary. For example, the Encoded Segment 140A may be encoded using the 8.5 TAB, while the Encoded Segment 140B is encoded using the 6.25 IAB and the Encoded Segment 140C is encoded using the 7 TAB. Thus, while existing systems may allow clients to move up and down the ladder (e.g., selecting a higher or lower bitrate for the current or next segment), embodiments of the present disclosure generate Output Streams 135 comprised of Encoded Segments 140 that can have differing bitrates. Using embodiments of the present disclosure, therefore, the system can output/transmit lower bitrates when possible, even if the client continues to request the higher bitrate.

In embodiments of the present disclosure, the system is quality-guided and does not merely select bitrates based on available bandwidth. Instead, the system adaptively selects an optimal or best bitrate for each rung of the ladder, while maintaining quality levels of each segment. This allows the system to maintain similar or matching media quality to the target bitrate, while minimizing the number of bits required to provide the content.

In some embodiments, a separate Output Stream 135 is generated for each MAB offered by the system 100. In some embodiments, the available MABs correspond to the TABs specified in the Encoding Ladder 115. In generating an Output Stream 135 for a given MAB, the system 100 can dynamically select an appropriate Encoded Segment 140, as discussed in more detail below. In one embodiment, this includes dynamically selecting between the segment encoded at the MAB and a segment encoded at a lower bitrate, if the lower bitrate does not reduce segment quality.

In one embodiment, to do so, the system 100 can iteratively encode each Segment 110A-N using each of the available bitrates (e.g., each TAB and each IAB). In some embodiments, rather than iterative or serial encoding, the system 100 can encode each Segment 100A-N using each available bitrate in parallel. The encoded segments can then be evaluated and combined to generate a set of MAB streams. In some embodiments, this evaluation is a post-processing step that occurs after all of the segments have been encoded at available bitrates. Once the MAB stream is generated, it can be streamed or transmitted to any number of clients. Advantageously, by selecting lower-bitrate segments when possible (e.g., when doing so would not reduce the quality of the segment received by clients), embodiments of the present disclosure reduce storage costs (because each MAB stream can be stored with fewer resources) as well as network costs (because fewer bits are transmitted for a given MAB).

Figure 2:
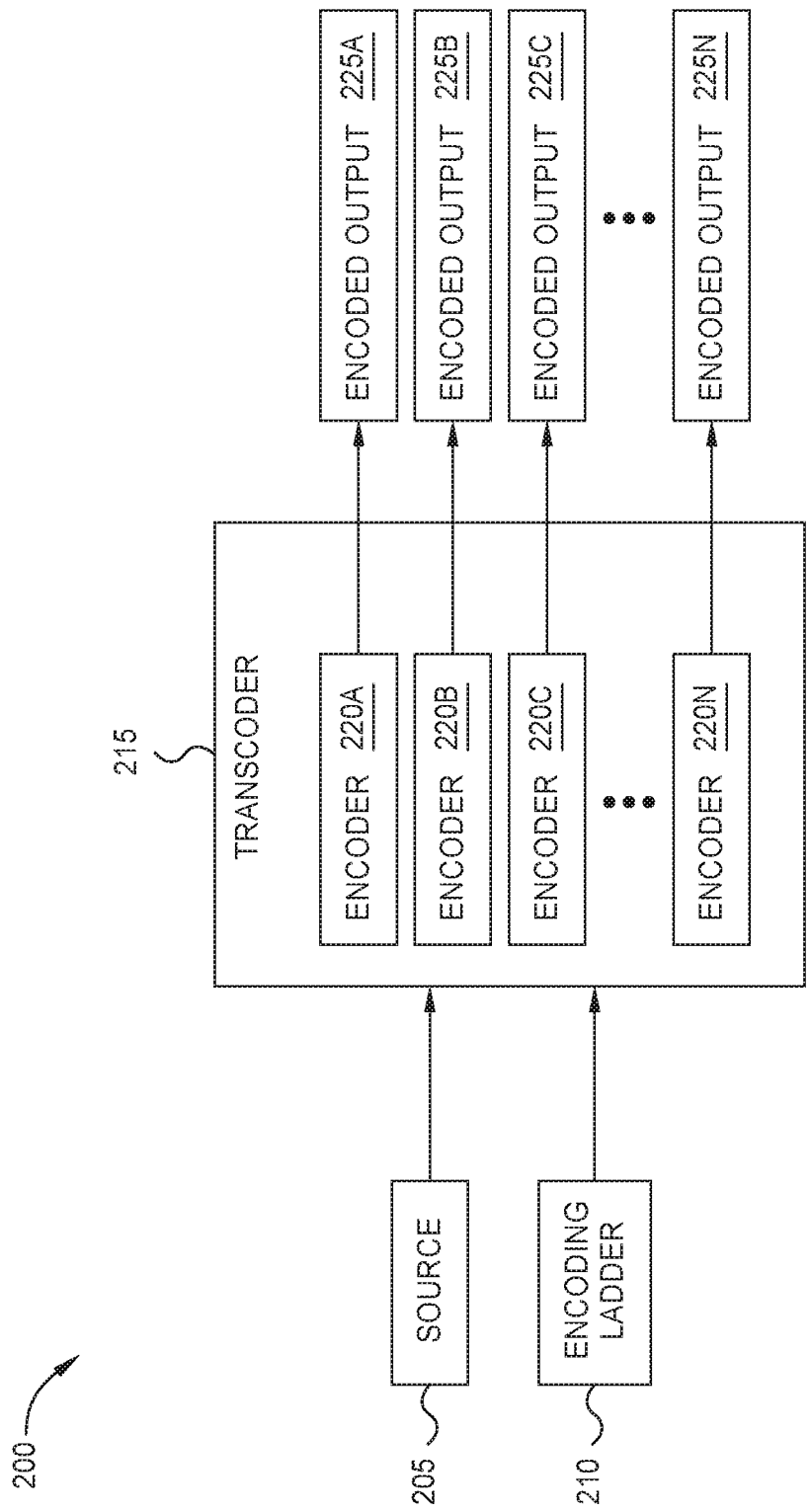
FIG. 2 illustrates a system configured to generate a variety of encoded output streams in order to provide segment quality-guided adaptive stream creation, according to one embodiment disclosed herein.

FIG. 2 illustrates a system 200 configured to generate a variety of encoded output streams in order to provide segment quality-guided adaptive stream creation, according to one embodiment disclosed herein. In the illustrated embodiment, a Source 205 and Encoding Ladder 210 are provided to a Transcoder 215. The Source 205 is generally a content asset, such as a video asset, audio asset, or multimedia asset. As discussed above, the Encoding Ladder 210 generally specifies a number of bitrates. In some embodiments, the Encoding Ladder 210 is selected based on the content or type of the Source 205. For example, the system 200 may utilize different ladders based on whether the Source 205 comprises two-dimensional animation content, three-dimensional computer rendering content, or live action video content. Other factors that add complexity (and therefore recommend more robust encoding ladders with high bitrates, a larger number of rungs, or both) include significant motion in the frame, wide color variance, and the like. In some embodiments, the Source 205 is evaluated using one or more existing techniques to select an Encoding Ladder 210 suited for the type and content of the Source 205.

In the illustrated embodiment, the Transcoder 215 utilizes a number of Encoders 220A-N to encode the Source 205, using the Encoding Ladder 210, into a set of Encoded Outputs 225A-N. Specifically, the Encoder 220A generates Encoded Output 225A, Encoder 220B generates Encoded Output 225B, and so on. In one embodiment, for each rung/bitrate specified by the Encoding Ladder 210, a corresponding Encoder 220 is utilized. For example, if the top bitrate in the Encoding Ladder 210 is 8.5 Mb/s, the Encoder 220A may be configured to encode the Source 205 at 8.5 Mb/s. In some embodiments, the Encoding Ladder 210 has already been augmented with one or more IABs between the traditional TABs. In other embodiments, the Transcoder 215 selects one or more IABs based on the TABs specified in the Encoding Ladder 210, and configures corresponding Encoders 220 for the TABs and IABs.

In an embodiment, encoding the Source 205 using a given Encoder 220 includes encoding each individual segment of the Source 205 at the bitrate of the Encoder 220, such that the segments can be transmitted at the corresponding bitrate (e.g., over a network). Thus, the Encoded Output 225 can comprise a sequence of encoded segments of the Source 205. In some embodiments, as discussed below in more detail, the system 200 will select encoded segments from the Encoded Outputs 225A-N when building an output stream for a given MAB.

In an embodiment, each TAB specified in the Encoding Ladder 210 is generally equivalent to a corresponding MAB. That is, in traditional systems, when a client requests a stream at a given MAB, the system selects and outputs encoded video that equals this bitrate. In embodiments of the present disclosure, however, the system 200 can intelligently select lower bitrates (e.g., one or more IABs or lower TABs) to output, which reduces computational load. For example, such an embodiment can reduce storage requirements and delivery costs by providing lower-bitrate segments than requested.

Although not included in the depicted embodiment, in some embodiments, the system 200 additionally performs quality assessment on each Encoded Output 225. That is, the system 200 may evaluate each individual segment of each Encoded Output 225, in order to generate a quantitative and objective quality score for each encoded segment. This allows the system 200 to know the visual quality of every segment at every available bitrate and resolution. In various embodiments, the quality assessment can utilize one or more objective quality algorithms, such as peak signal-to-noise ratio (PSNR), structural similarity (SSIM), video multimethod assessment fusion (VMAF), and the like. This produces a quality assessment of each segment, which may be a single value (e.g., a weighted combination of one or more objective scores), or a set of values (e.g., a lowest score, a highest score, a mean score, standard deviations, rolling average scores, and the like).

Figure 3:
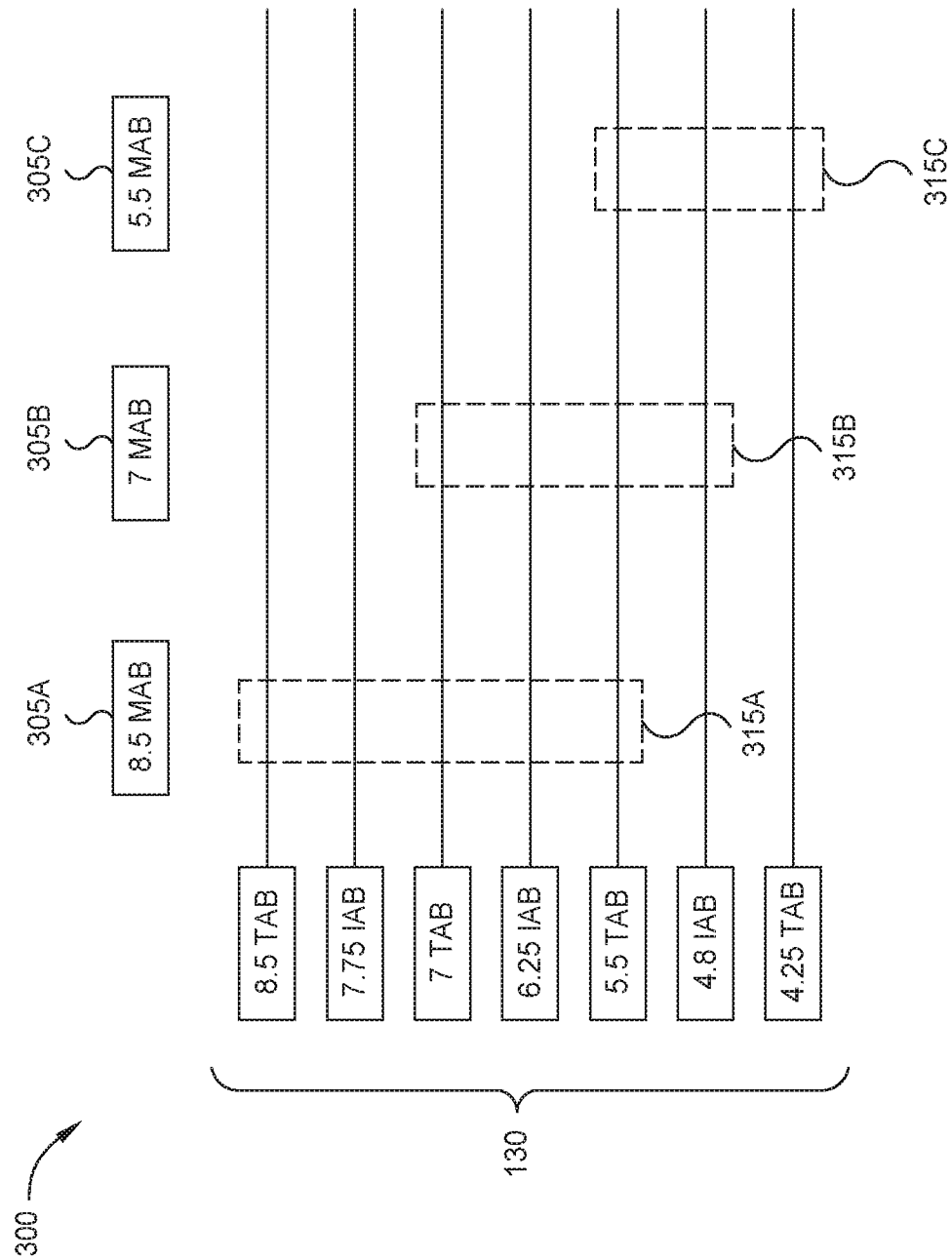
FIG. 3 depicts segment pools for a variety of different streams with different maximum average bitrates, according to one embodiment disclosed herein.

FIG. 3 is a chart 300 depicting segment pools for a variety of different streams with different maximum bitrates, according to one embodiment disclosed herein. In the illustrated embodiment, the Augmented Encoding Ladder 130 is depicted to visualize the available bitrates, and a set of Pools 315A-C are depicted for a few potential MABs 305A-C. In some embodiments, after the quality assessment of each encoded segment is completed, a segment is chosen from a pool of encoded TAB/IAB segments for each MAB. That is, for each segment of the output, the system can select an encoded IAB or TAB segment for each MAB. For example, for the first segment of the original input source, the system will select a first encoded version of the first segment for the first MAB 305A (at 8.5 Mb/s), a second encoded version of the first segment for the MAB 305B (at 7 Mb/s), a third encoded version of the first segment for the MAB 305C (at 5.5 Mb/s), and so on. This process is repeated for each segment of the input source (and for each available MAB).

As discussed above, in traditional systems, the system simply selects the TAB segment that corresponds to the same bitrate as the requested MAB. Thus, for the MAB 305A, existing systems simply select the segment encoded by the 8.5 Mb/s TAB. In the illustrated embodiment, however, the system defines a pool of potential segments for each MAB 305A-C. The pool of potential encoded segments for the MAB 305 includes the corresponding TAB of the MAB 305, as well as a set of one or more TABs, IABs, or both IABs and TABs included below the corresponding TAB. As illustrated, for the MAB 305A (corresponding to 8.5 Mb/s), the Pool 315A includes the segment corresponding to the 8.5 Mb/s TAB, the segment corresponding to the 7.75 Mb/s IAB, the segment corresponding to the 7 Mb/s TAB, the segment corresponding to the 6.25 Mb/s IAB, and the segment corresponding to the 5.5 Mb/s TAB.

Thus, during segment selection for the MAB 305A, the system may select any of the segments between 8.5 Mb/s and 6.25 Mb/s. In various embodiments, the Pools 315 may be static or dynamic. In one embodiment, the Pools 315 utilize a static configuration (e.g., a predefined fixed depth). In another embodiment, the depth of each Pool 315 (e.g., the number of rungs or bitrates included) is a predetermined. In still another embodiment, the depth is dynamically set based on, for example, content characteristics, machine learning, and the like. In embodiments, the lowest depth (bitrate) of a given Pool 315 represents the best-case (e.g., the lowest) average bitrate output for a given MAB 315. For example, in the illustrated embodiment, the Pool 315b of the MAB 305B (the 7 Mb/s maximum bitrate output), which has the 4.8 Mb/s IAB at its lowest end, indicates that the ultimate average bitrate of the 7 Mb/s output will be greater than or equal to 4.8 Mb/s, and less than or equal to 7 Mb/s.

In embodiments, these Pools 315 may be defined or configured within the encoder itself, or in one or more downstream components. Although the illustrated Augmented Encoding Ladder 130 utilizes seven rungs, in embodiments, there may of course be any number of layers/bitrates, as discussed above. Further, although three MABs 305A-C are included in the illustrated embodiment, the system may of course provide any number and variety of MABs. Additionally, although the depicted embodiment includes Pools 315A-C of depth five, four, and three, respectively, in embodiments, the depth of each Pool 315 may of course be any value, and each pool may include any number of potential bitrates. Further, as illustrated, each Pool 315 can include not only lower IAB(s), but also lower TABs.

Figure 4:
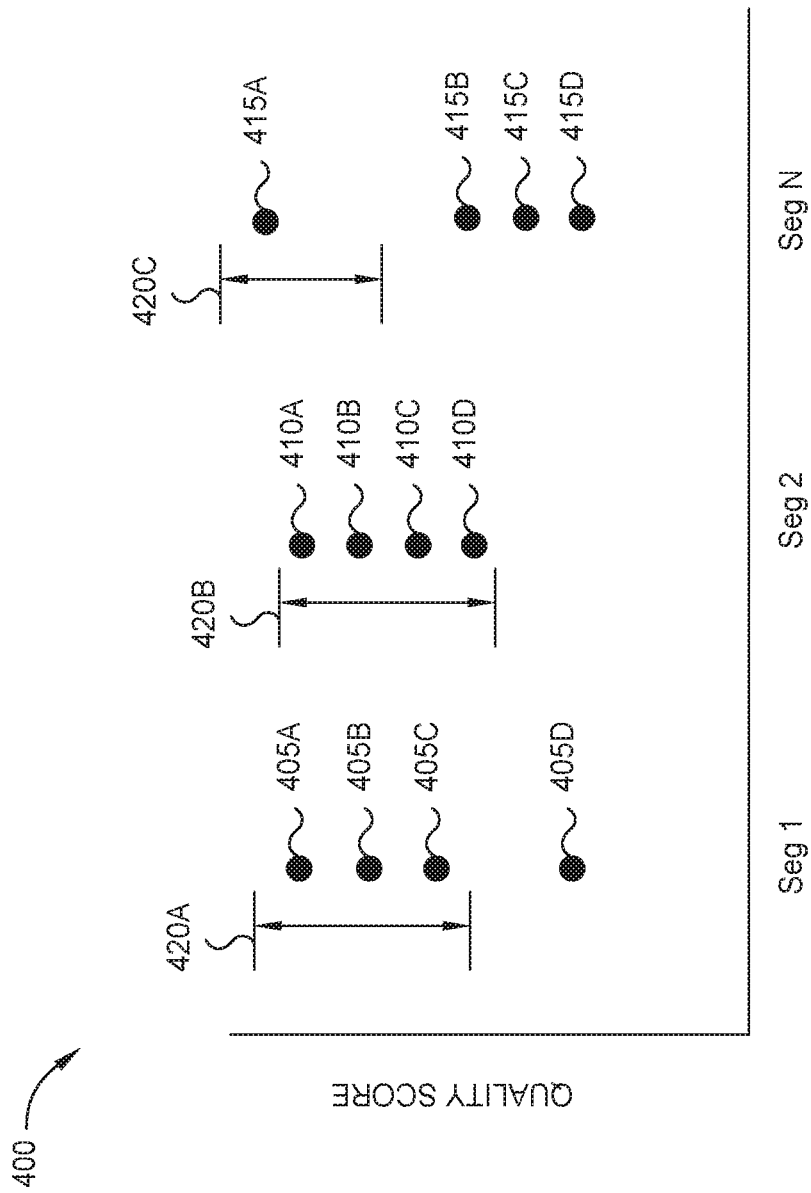
FIG. 4 illustrates segment quality analysis in order to provide segment quality-guided adaptive streaming, according to one embodiment disclosed herein.

FIG. 4 depicts a graph 400 illustrating segment quality analysis in order to provide segment quality-guided adaptive streaming, according to one embodiment disclosed herein. In some embodiments, the segment selection process for a given MAB (from the Pools 315, discussed above) includes evaluation of the quality scores that were previously generated for each encoded version of a given (original) segment. In one embodiment, to select the encoded segment for a given MAB, the quality of each segment in the corresponding pool is evaluated. The system can select the encoded segment with the lowest bitrate whose quality score is within a predefined tolerance from the quality score of the MAB's corresponding TAB segment.

In some embodiments, this tolerance is configured to be less than a just noticeable difference (JND), such that typical users cannot notice any difference in visual quality between the TAB segment and the selected lower-bitrate segment. While minimizing the ultimate output bitrate, this ensures that the chosen segment quality is not visually worse than what would have been produced by choosing the MAB's corresponding TABs segment. For example, for an 8.5 Mb/s MAB, the system can determine the quality score of the corresponding TAB segment (e.g., the segment encoded at 8.5 Mb/s). This TAB segment quality score can then be used to select a lower-bitrate segment included in the MAB's pool.

In the illustrated graph 400, the segment Quality Score is graphed on the vertical axis, while various segments in the output are graphed on the horizontal axis. The Points 405, 410, and 415 represent the quality score of various encoded segments. For example, the Points 405A-D represent quality scores for four different variants (e.g., different bitrates) for Seg1. Similarly, the Points 410A-D represent quality scores for four different variants (e.g., different bitrates) for Seg2, and the Points 415A-D represent quality scores for four different variants (e.g., different bitrates) for SegN. In the illustrated embodiment, the depth of the pool for the depicted MAB is four. That is, there are four segment variants available for selection when generating the output stream at the given MAB. Thus, for each segment in the stream, the system can select between four potential encoded segments (e.g., four bitrates).

For example, suppose the depicted graph 400 is for an 8.5 Mb/s MAB. In such an embodiment, the highest-quality variant of each encoded segment (the highest Point 405, 410, and 415) is likely the segment encoded at the 8.5 Mb/s TAB (e.g., the Points 405A, 410A, and 415A). Continuing this example, the next lower point (e.g., the Points 405B, 410B, and 415B) correspond to the next-lower bitrate (e.g., the 7.75 Mb/s IAB), while the next-lower point beyond the 7.75 Mb/s rate (the Points 405C, 410C, and 415C) correspond to the 7 Mb/s TAB. Further, the lowest-quality segments in the pool (depicted by the Points 405D, 410D, and 415D) correspond to the segment encoded at the 6.25 Mb/s IAB.

As illustrated, the quality of each lower bitrate can differ substantially, depending on the particular content of the given segment. For example, for the first segment (Seg1), the segments encoded at 8.5 Mb/s, 7.75 Mb/s, and 7 Mb/s have similar quality scores, while the segment encoded at 6.25 Mb/s is significantly lower. For the second segment (Seg2), all four encoded segments have similar quality scores. Additionally, for the Nth segment (SegN), the 8.5 Mb/s encoded segment has a relatively high quality, and none of the remaining segments (encoded at lower bitrates) have nearly as high visual quality.

In embodiments, as discussed above, the system compares the quality scores to one or more thresholds to determine which encoded variant should be selected for a given segment. In the illustrated embodiment, these thresholds are depicted by the Tolerances 420A-C. In at least one embodiment, the Tolerances 420A-C correspond to a difference in visual quality that is not noticeable by a typical human user. As discussed above, the minimum acceptable quality score is defined based on the quality of the highest-quality segment (e.g., the segment encoded at the TAB that corresponds to the MAB). Thus, the Tolerances 420A-C are depicted as measuring the allowable variance below the quality of the highest-scored encoded variant of each segment.

In some embodiments, other techniques can additionally or alternatively be utilized to define the allowable variance. For example, in one such embodiment, the system can optionally utilize a predefined floor, where segments below the floor are ignored even if they fall within the tolerance. Similarly, in some embodiments, the system may utilize a predefined ceiling, where the predefined tolerance can be ignored if the quality score is above a predefined ceiling.

For the first segment (Seg1), the encoded variant represented by the Point 405C is within the Tolerance 420A, while the next-lower Point 405D is not. Thus, in the illustrated embodiment, the system will select the encoded segment represented by Point 405C (e.g., the 7 Mb/s TAB) to use as the first segment of the output on the 8.5 Mb/s MAB stream. For the second segment (Seg2), the lowest-bitrate segment that falls within the Tolerance 420B is the lowest segment in the pool, represented by Point 410D (e.g., the 6.25 Mb/s segment). Thus, for the second segment, the system will select this encoded variant. Further, for the Nth segment (SegN), only the 8.5 Mb/s TAB segment is within the Tolerance 420C. Thus, for this segment, the system will utilize the highest-bitrate variant.

Advantageously, this enables the system to dynamically select segments encoded at lower bitrates when doing so would not affect the visual quality of the stream. This can significantly reduce the needed network bandwidth without impacting user experience. Further, in some embodiments, the system can store only the selected encoded segment for the stream, and discard all others. For example, the system may store the segments represented by Points 405C, 410D, and 415A, and discard the remaining encoded segments. This dramatically reduces the storage costs required to store the MAB output stream. Similar evaluations can be performed for reach available MAB. Further, as discussed in more detail below, in some embodiments, the system can intelligently identify segment(s) that are used in more than one MAB stream, and consolidate these to a single shared copy, further reducing storage costs.

Figure 5A:
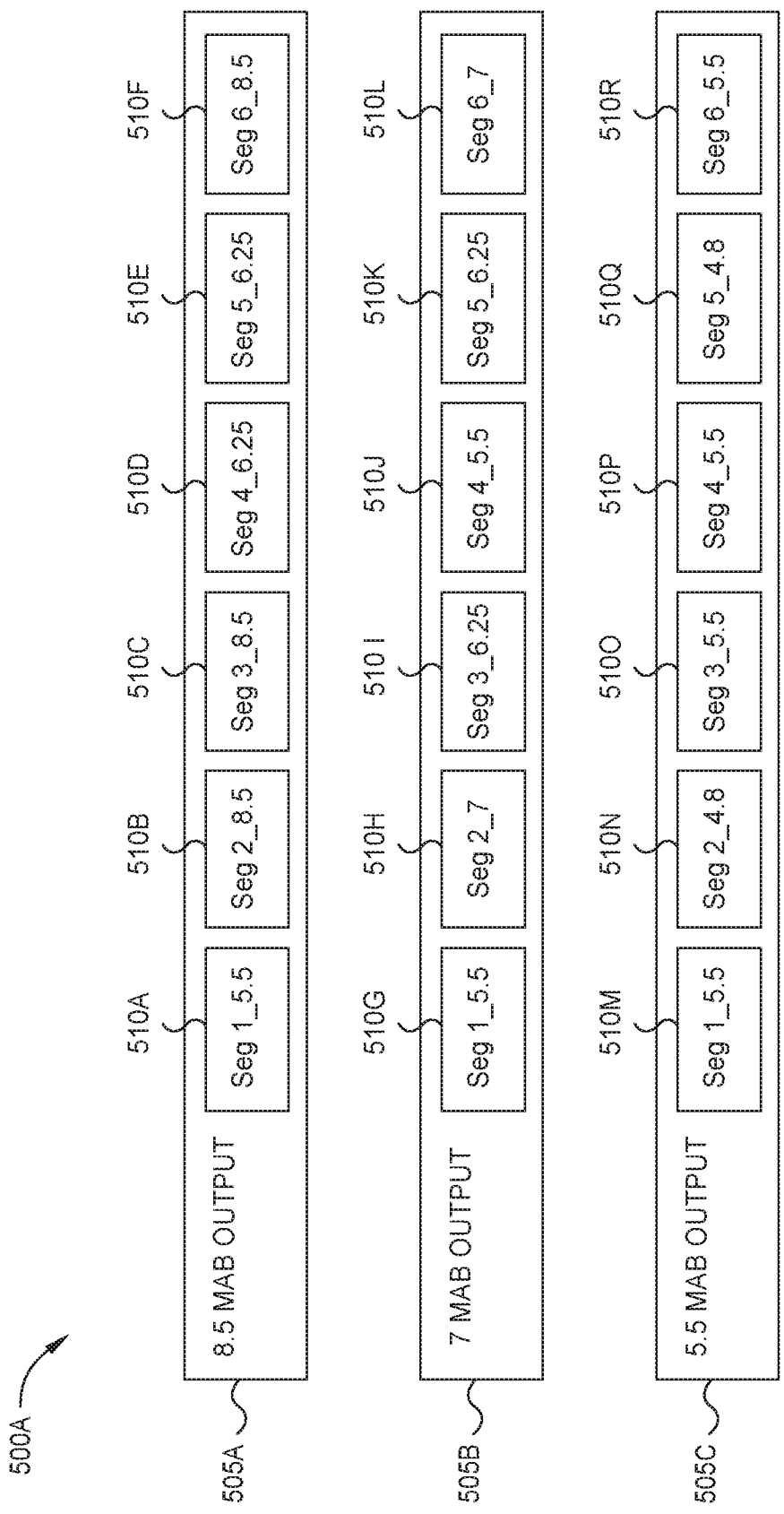
FIG. 5A depicts a set of differing bitrate streams generated using segment quality-guided adaptive techniques disclosed herein.

FIG. 5A depicts a set 500A of differing bitrate streams generated using segment quality-guided adaptive techniques disclosed herein. The illustrated embodiment includes an 8.5 Mb/s MAB Output 505A, a 7 Mb/s MAB Output 505B, and a 5.5 Mb/s MAB Output 505C. Although three MABs are depicted, in embodiments, there may of course be any number of available MABs. As discussed above, in embodiments, each MAB generally corresponds to the highest bitrate that the corresponding output will use. The client or providing system can generally select the MAB for a given client, based on the network conditions, compute conditions, and other factors. Each MAB Output 505A-C includes a sequence of Encoded Segments 510.

As discussed above, in traditional (non-SQA) transcoding systems, the MAB output will only contain segments that correspond to the MAB's TAB. For example, the 8.5 Mb/s MAB output would only contain segments from the 8.5 Mb/s TAB encoder. Utilizing embodiments of the present disclosure, however, each MAB output can include lower bitrates for various segments, if the visual quality will not suffer. Of note, however, each MAB Output 505A-C outputs an encoded variant of the same original segment for the corresponding section of the output. For example, all three MAB Outputs 505A-C begin with an encoded segment (Segments 510A, 510G, and 510M) corresponding to "Seg1," and proceed sequentially to "Seg7." However, the encoded bitrate of each differs.

For example, in the illustrated embodiment, the MAB Output 505A includes Segment 510A encoded at 5.5 Mb/s, Segment 510B encoded at 8.5 Mb/s, Segment 510C encoded at 8.5 Mb/s, Segment 510D encoded at 6.25 Mb/s, Segment 510E encoded at 6.25 Mb/s, and Segment 510F encoded at 8.5 Mb/s. The MAB Output 505B includes Segment 510G encoded at 5.5 Mb/s, Segment 510H encoded at 7 Mb/s, Segment 510I encoded at 6.25 Mb/s, Segment 510J encoded at 5.5 Mb/s, Segment 510K encoded at 6.25 Mb/s, and Segment 510L encoded at 7 Mb/s. Further, the MAB Output 505C includes Segment 510M encoded at 5.5 Mb/s, Segment 510N encoded at 4.8 Mb/s, Segment 510O encoded at 5.5 Mb/s, Segment 510P encoded at 5.5 Mb/s, Segment 510Q encoded at 4.8 Mb/s, and Segment 510R encoded at 5.5 Mb/s.

Thus, as illustrated, by utilizing the embodiments disclosed herein, each MAB Output 505A-C can selectively utilize segments with significantly reduced bandwidth. In an embodiment, this stream generation is performed during a preparation phase (e.g., when the asset is ingested), and the MAB Outputs 505A-C are stored in one or more storage locations. This may include storing the sequential Segments 510A-R themselves, storing a sequential list of the segments (e.g., using pointers or links to the actual storage location of each segment), and the like. Subsequently, when any client requests a stream of a maximum bitrate, the system can retrieve the matching MAB Output 505, and begin transmitting the corresponding Segments 510 sequentially.

Notably, as discussed above, the MAB Outputs 505 require fewer storage resources, as compared to traditional systems. For example, in the 8.5 MB/s MAB Output 505A, only three of the Segments 510B, 510C, and 510F, are actually 8.5 MB/s segments. The remaining segments are encoded for lower bitrates, and thus are smaller file sizes and require fewer resources to store, process, and transmit. In some embodiments, additional optimizations can be applied to further reduce the computing resources.

Figure 5B:
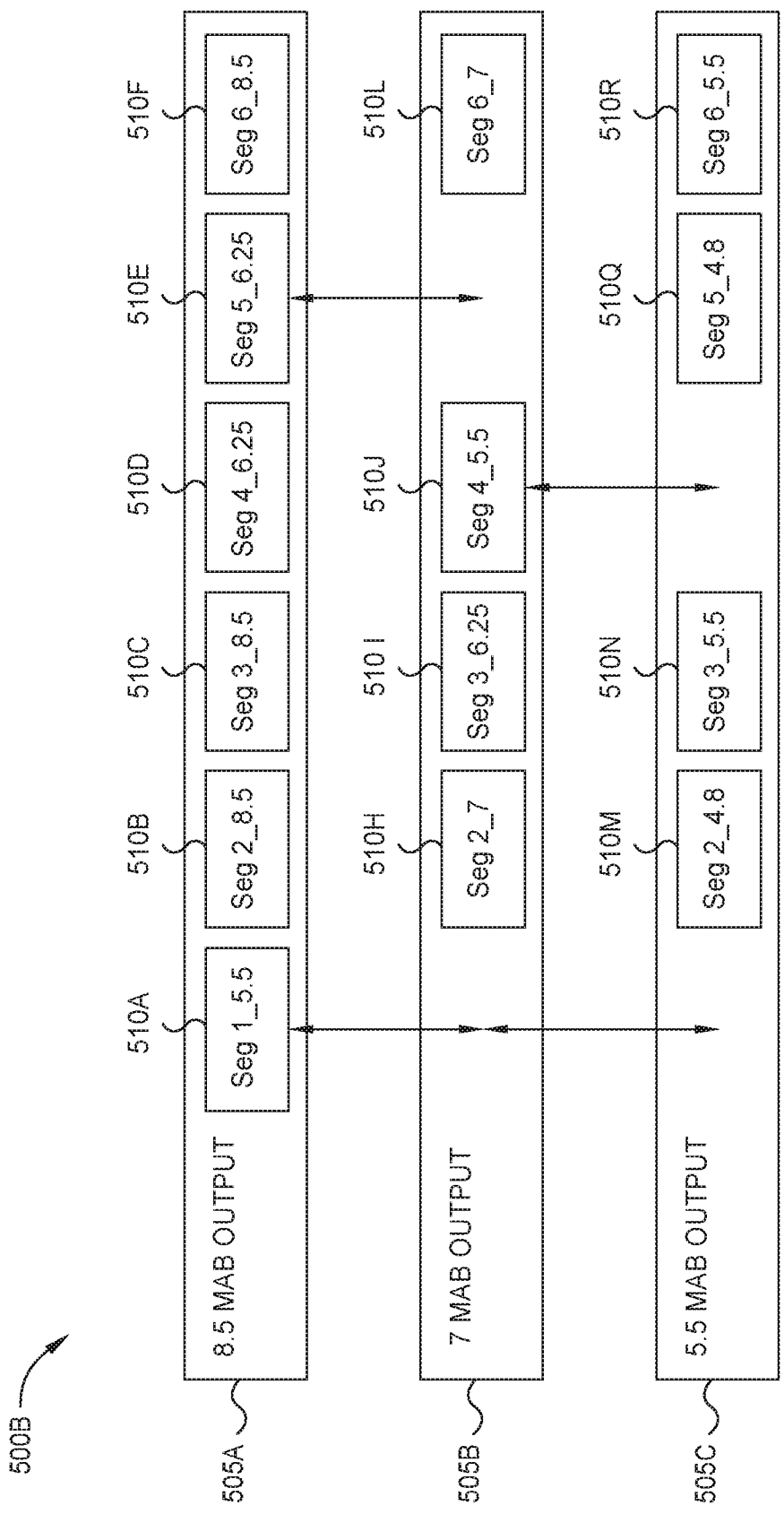
FIG. 5B depicts an optimized set of differing bitrate streams generated using segment quality-guided adaptive techniques disclosed herein.

FIG. 5B depicts one such optimized set 500B of differing bitrate streams generated using segment quality-guided adaptive techniques disclosed herein. As discussed above, utilizing the SQA transcode techniques disclosed herein, segments in each output are selected from the MAB's pool, and thus a given MAB output can contain segments encoded for lower bitrates than the MAB. Additionally, because pools can overlap, the same encoded segment may be present in multiple outputs. For example, as illustrated in FIG. 3, the Pools 315A and 315B overlap (e.g., both include the 7 MB/s TAB and the 6.25 MB/s IAB), indicating that the 8.5 MB/s MAB output and the 7 MB/s MAB output may both use the same encoded segments (e.g., a segment encoded at 7 MB/s or 6.25 MB/s).

In some embodiments of the present disclosure, the encoding process includes attaching unique identifiers to each encoded segment (including both TAB and IAB segments). In one such embodiment, additional downstream processing can identify common/shared encoded segments across variants, and store and deliver a common single copy of the shared segment. This improves efficiency and storage resources as compared to storing duplicates of the same encoded segment. That is, the system need only store one copy of each encoded segment, and each MAB Output 505 can include a pointer to the copy, as needed.

Additionally, optimizing these common segments can reduce required network resources caused by delivering duplicate segments through the content delivery network (CDN). In some embodiments, many CDNs cache segments at a relatively local locations. For example, received segments may be cached locally within an enterprise, in a locality, by the internet service provider (ISP), and the like. These caches can significantly reduce network load. When multiple clients are streaming the same MAB Output 505, the local cache can be used to provide the next segment (when it is available), rather than requesting it from the original stream provider.

By noting the identifiers of common segments, the cache can provide local cached segments that were originally downloaded for any MAB output. For example, suppose an encoded segment was downloaded as part of a first stream to a first client at a first bandwidth (e.g., an 8.5 Mb/s stream). If another client using the same MAB begins the stream, the cache may be used to provide the next segment. In existing systems, however, a client using another MAB (e.g., a 7 Mb/s MAB) is forced to download the corresponding variant from the source provider. However, by noting overlapping segments (e.g., if both the 8.5 Mb/s and 7 Mb/s streams use the same encoded segment for one or more portions of the output), the cache can provide the second client (streaming the 7 Mb/s output) with the cached copy of the common segments. This significantly reduces required bandwidth.

As illustrated in FIG. 5A, all three MAB Outputs 505A-C use the 5.5 Mb/s bitrate for Seg1 (Segment 510A, 510G, and 510M). Thus, in the illustrated embodiment of FIG. 5B, the system has consolidated these common segments to a single shared Segment 510A, and replaced the other copies (in the MAB Outputs 505B and 505C) with a pointer to the shared copy. Although depicted as stored with the MAB Output 505A, in some embodiments, system may store the shared copy in a separate location, and include a pointer to this copy within all of the MAB Outputs 505A-C.

Similar optimizations are illustrated in the fourth and fifth segments of the stream. That is, the MAB Outputs 505B and 505C both use the 5.5 Mb/s encoded Segment 510 in Seg4, and the system has therefore eliminated one copy of the Segment 510P, replacing it with a pointer to the shared Segment 510J. Further, because the MAB Outputs 505A and 505B share the 6.25 Mb/s encoded Segment 510 for Seg5, the system has similarly replaced one or both with a pointer to a shared copy of this encoded segment.

Figure 6:
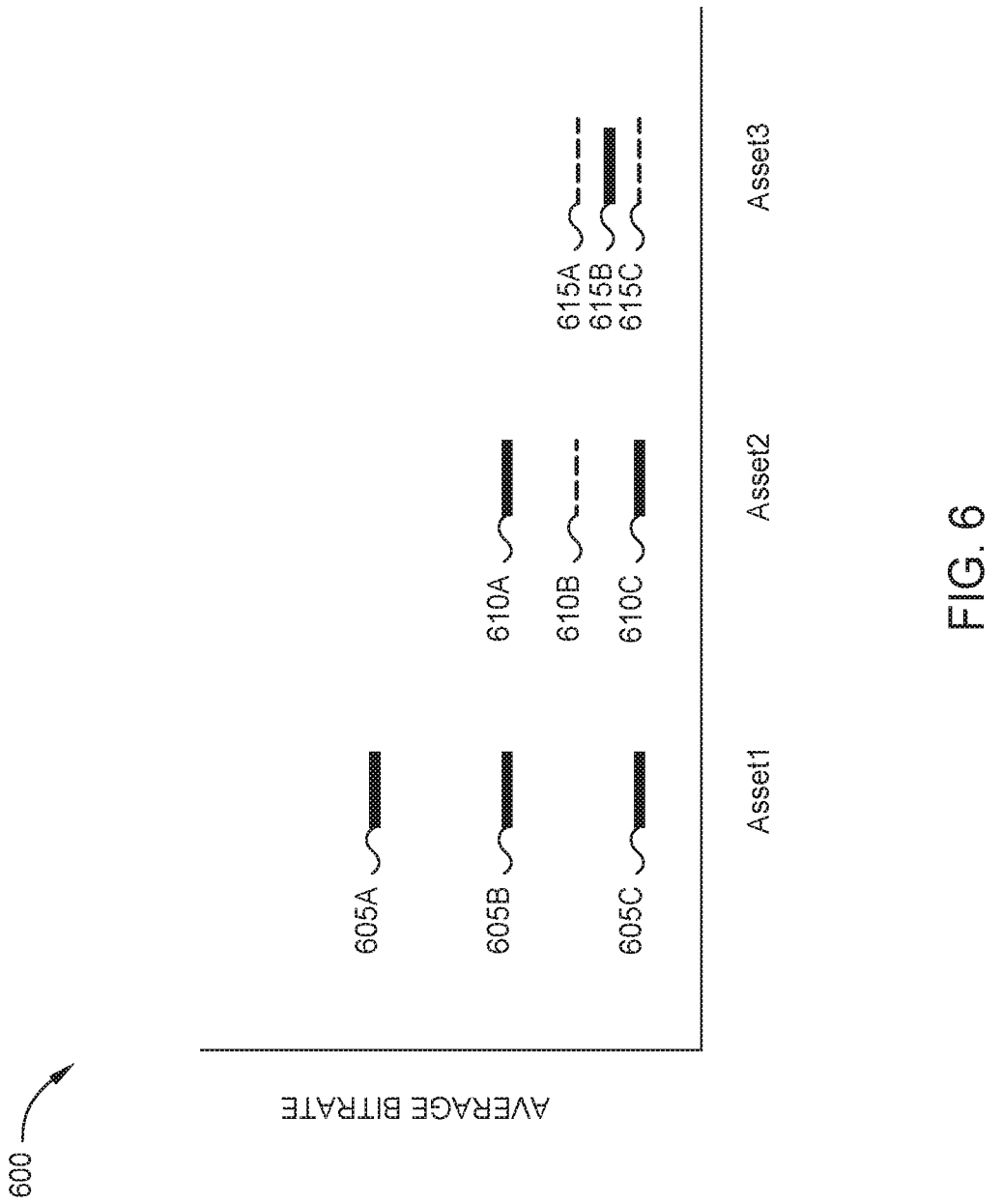
FIG. 6 illustrates optimized reductions in available output bitrates utilizing segment quality-guided adaptive techniques disclosed herein.

FIG. 6 depicts a graph 600 illustrating further optimized reductions in available output bitrates utilizing segment quality-guided adaptive techniques disclosed herein. As discussed above, the average bitrate of a given MAB output can be any value between the MAB's highest bitrate (the MAB itself) and the lowest bitrate included in the pool. Across different MABs (in a given screen resolution), therefore, the average output bitrates can often be fairly similar. Further, if two or more of the MAB pools share the same lowest bitrate, it is possible for the average bitrate of such MAB outputs to be exactly the same (if each of the MABs use the lowest bitrate in the pool), or very close to one another. This can present various opportunities for further optimizations.

The graph 600 depicts a visual representation of possible distributions of SQA output bitrates. In the depicted embodiment, various assets are graphed along the horizontal axis, and the average bitrate of each MAB for the asset are graphed on the vertical axis. For example, the upper-most Lines 605A, 610A, and 615A may represent the highest available MAB (e.g., 8.5 Mb/s), the next Lines 605B, 610B, and 615B may represent the next-lowest MAB (e.g., 7 Mb/s), and the lowest Lines 605C, 610C, and 615C may represent the lowest MAB (e.g., 5.5 Mb/s). Of course, although three MABs are illustrated, in embodiments, there may of course be any number of available MABs.

As illustrated, for a first media source (labeled as Asset1), the average bitrate varies significantly, depending on the MAB selected. That is, there is a substantial gap in the actual average bitrate the client receives, depending on the MAB they select. This is visualized by a relatively far spread between the Lines 605A-C. For the Asset3, however, the gap between the Lines 615A-C is significantly reduced, indicating that the average bitrate changes very little, regardless of the selected MAB. In the most extreme example, the lines would converge to a single point (e.g., if two or more of the MAB outputs all selected the same segment bitrate).

In many embodiments, ABR ladders presented to clients are designed to have rungs that are neither too close in rate nor too far. If the rungs are too far apart, the system may struggle to supply the bandwidth needed for a higher bitrate, but deliver lower quality video at the next-lower bitrate. With additional rungs between, the system can find a balance. If the rungs are too close, the client may frequently move up and down the ladder to adjacent rates as conditions shift. This significantly reduces the efficiencies which can be gained by local caching. As illustrated in FIG. 6, however, some embodiments of the present disclosure, through optimization of output bitrates, can in some cases produce ladders with rungs that are quite close together.

In some embodiments, therefore, the system can take further action. In at least one embodiment, the master listing of the ABR variants can still include all of the MABs, even though the actual average bitrates for each of these variants may be much less than their advertised rates. This may be beneficial if the peak bitrate of the asset differs substantially from the average rate. That is, a given MAB output may still have some segments encoded at the original MAB peak rate, even if most of the segments are encoded much lower. By retaining all MAB outputs, the content provider can ensure that each of the output streams remains high quality, including any peaks within them.

In some embodiments, an analysis of the resultant MAB output average-bitrates, segment peak rates, and the like can be performed. Based on this analysis, the system may determine to remove one or more of the MAB output variants. For example, suppose all MAB outputs have optimized down to using the exact same set of encoded segments. In such a case, all MAB outputs will be precisely the same (with the same average and peak bitrates). Thus, in such an implementation, there is no benefit in retaining all MAB outputs, or in presenting them to clients.

In some embodiments, therefore, the system can evaluate and identify MAB outputs that should be removed. In the illustrated embodiment, for Asset1, the system has determined that the average bitrates are sufficiently distributed, such that all the MAB options should be retained. For the Asset2, however, the system has determined that the variant represented by Line 610B is within a predefined threshold distance from the variants represented by the Line 610A or 610C (or both). Thus, as illustrated by the dashed lines, the system has determined to remove the variant indicated by Line 610B. In such an embodiment, when streaming Asset2, clients can be presented with two variants: the one represented by Line 610A (e.g., at 8.5 Mb/s), or the one represented by Line 610C (e.g., at 5.5 Mb/s). In addition to removing the advertised middle variant (e.g., 7 Mb/s), in some embodiments, the system can further delete this MAB output from its storage, in order to reduce storage usage.

Similarly, for Asset3, the system has decided to cull both the highest variant (represented by the dashed Line 615A) and the lowest variant (represented by the dashed Line 615C), based on determining that they are within a predefined threshold difference from the variant represented by the Line 615B. In an embodiment, therefore, the system can determine to eliminate these variants (e.g., by refraining from advertising them, deleting them, and the like). This can significantly improve storage efficiencies, and further improve the overall operations of the system.

In some embodiments, eliminating the MAB stream includes refraining from advertising the MAB to clients, and forcing the client to pick from the remaining MAB(s). In at least one embodiment, the streaming system may continue to advertise all of the traditional MABs, however. Upon receiving a request for a MAB stream that has been culled, the system may instead provide the identified similar MAB stream. This allows the system to optimize its resources without any change or notification to client devices.

Figure 7:
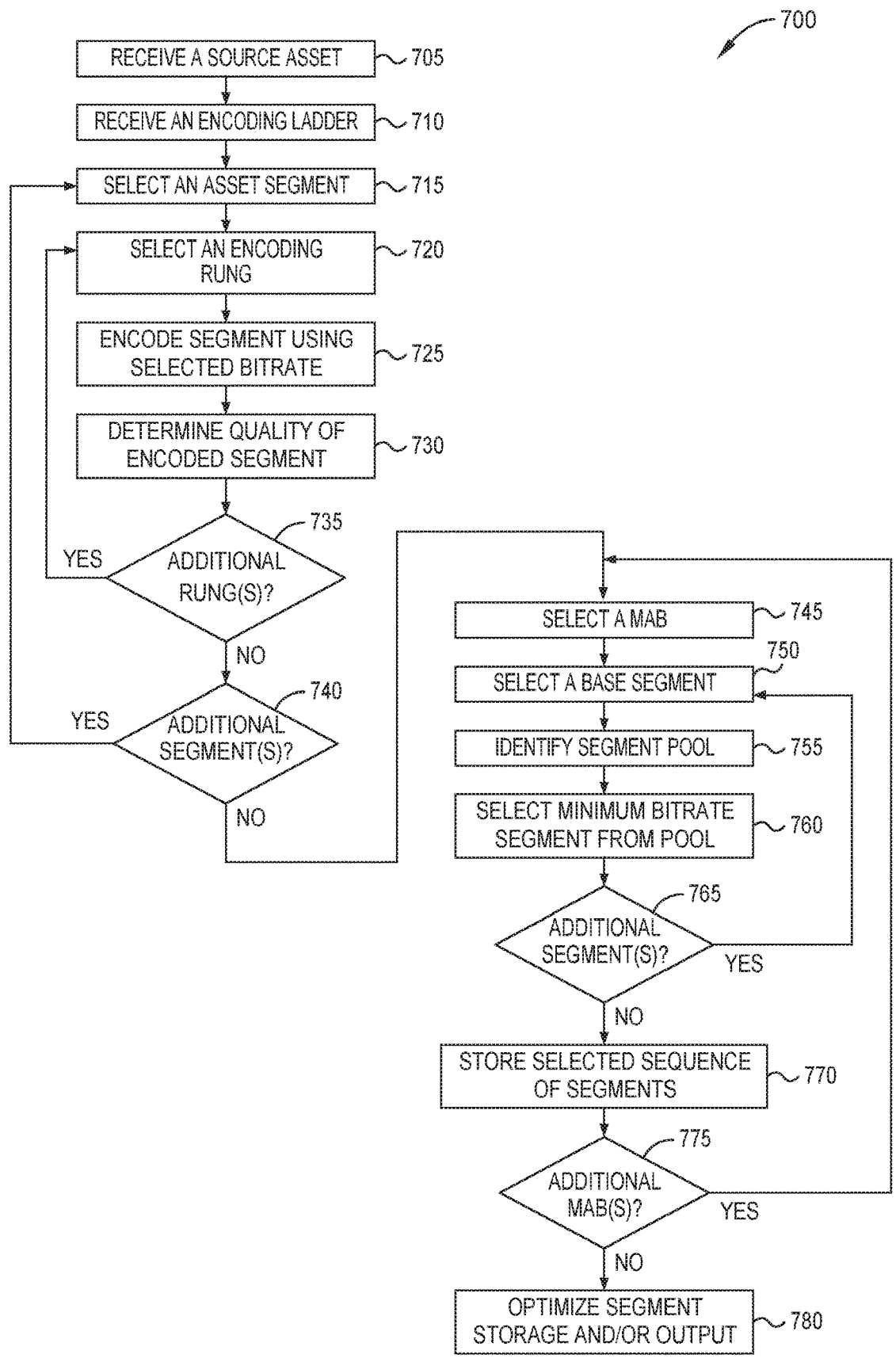
FIG. 7 is a flow diagram illustrating a method for segment quality-guided adaptive stream generation, according to some embodiments disclosed herein.

FIG. 7 is a flow diagram illustrating a method 700 for segment quality-guided adaptive stream generation, according to some embodiments disclosed herein. The method 700 begins at block 705, where a streaming system receives a source asset. In embodiments, as discussed above, this asset can include audio, video, multimedia streams with video and audio, and the like. In an embodiment, this source asset can include an uncompressed asset that can be compressed/encoded at any bitrate. The method 700 then continues to block 710.

At block 710, the streaming system receives an encoding ladder for use in encoding the source asset. In some embodiments, as discussed above, this is a predefined ladder. In at least one embodiment, the ladder is a type or content-specific ladder that has been selected based on the type or content of the asset. In some embodiments, the ladder has IABs already integrated into it. In another embodiment, the streaming system can first select one or more IABs based on the TABs specified in the ladder.

The method 700 then continues to block 715, where the streaming system selects a segment of the video. In some embodiments, the asset has been previously delineated into segments. In another embodiment, the streaming system evaluates the asset to define the segments using one or more known techniques. After a segment has been selected, the method 700 proceeds to block 720, where the streaming system selects one of the encoding rungs specified in the (augmented) encoding ladder. At block 725, the streaming system encodes the selected segment at the selected bitrate.

At block 730, the streaming system then evaluates the segment using one or more quality assessment techniques to generate a quality score for the encoded segment (that is, for the selected segment encoded at the selected bitrate). The method 700 then proceeds to block 735, where the streaming system determines whether there is at least one additional rung (i.e., bitrate) specified in the encoding ladder. If so, the method 700 returns to block 720 to select the next rung. Otherwise, if the selected segment has been encoded at all possible bitrates, the method 700 continues to block 740.

At block 740, the streaming system determines whether there is at least one additional segment in the asset that has not-yet been encoded. If so, the method 700 returns to block 715 to select the next segment. Otherwise, the method 700 proceeds to block 745. In this way, the streaming system can generate encoded variants of each segment at each possible bitrate. These encoded segments are stored for evaluation and analysis, in order to generate the set of MAB outputs. In various embodiments, this storage can include any number of suitable alternatives, including on one or more hard drives or solid state drives, in memory (e.g., random access memory), and the like.

At block 745, the streaming system selects one of the available/potential MAB outputs. As discussed above, in embodiments, each MAB represents a maximum average bitrate option. Clients can select among the MABs, and the streaming system sequentially transmits segments from the selected MAB to the client. The method 700 then continues to block 750, where the streaming system selects one of the base segments. In one embodiment, the base segment refers to a segment encoded in the TAB of the selected MAB. For example, for the 8.5 Mb/s MAB, each base segment is one of the segments in the source asset, encoded at 8.5 Mb/s. In another embodiment, the base segment refers to an original (un-encoded) segment in the source asset.

The method 700 then proceeds to block 755, where the streaming system identifies the pool of potential segments for the base segment. In one embodiment, this includes determining the pool depth, as discussed above. This pool depth may be static or dynamic, and may be selected manually, based on machine learning, and the like. In one embodiment, if the base segment is the TAB segment for the MAB, identifying the pool includes identifying the potential alternate segments for this selected segment (e.g., the variants of the same segment encoded at lower bitrates). In embodiments where the base segment refers to a segment in the original source, identifying the pool includes identifying all encoded segments (within the depth of the pool for the selected MAB) that correspond to the selected base segment.

At block 760, the streaming system selects and identifies the minimum bitrate segment in the pool. In one embodiment, as discussed above, this selection is based on the quality scores of each segment. For example, the streaming system may select the potential segment in the pool that has the lowest bitrate, as long as the quality score is within predefined criteria (e.g., a tolerance or threshold of the highest-quality segment). If the quality score is too low, the streaming system may select the next-highest bitrate segment. Once the minimum-bitrate acceptable segment is identified for the base segment, the method 700 continues to block 765, where the streaming system determines whether there is at least one additional base segment to be evaluated for the selected MAB.

If so, the method 700 returns to block 750. Otherwise, the method 700 continues to block 770. Thus, the streaming system can iteratively proceed through each segment in the source asset in order to identify, for each respective source segment, the lowest-bitrate encoded segment that is of sufficient quality for the selected MAB. At block 770, the streaming system stores the selected sequence of encoded segments as a generated MAB output. In this way, the streaming system can generate an optimized output for the selected MAB that reduces the bitrate of some segments without reducing quality. This improves computational usage.

The method 700 then proceeds to block 775, where the streaming system determines whether there is at least one additional MAB that has not been evaluated/generated. If so, the method 700 returns to block 745. Otherwise, if all MAB outputs have been created, the method 700 continues to block 780. In this way, the streaming system can generate optimized MAB outputs iteratively or in parallel for all available MABs. At block 780, the streaming system can optionally proceed to optimize the segment storage, output, or both storage and output, as discussed above.

For example, in one such embodiment, the streaming system can identify common encoded segments across differing MAB outputs, and consolidate these common segments into a shared copy as discussed above with respect to FIG. 5. Each MAB output can then be revised to include a link or pointer to this single shared copy. In some embodiments, the streaming system can analyze the similarity between each overall MAB output in order to identify outputs that are sufficiently similar, as discussed above with reference to FIG. 6. MAB outputs that are sufficiently similar can be eliminated from the system.

Although the method 700 is depicted as a sequential or serial process for conceptual clarity, in some embodiments, aspects of the method 700 may be performed effectively simultaneously (e.g., in parallel). For example, in some embodiments, the system can encode a segment at a given bitrate and determine the quality of the segment at the bitrate, then iteratively repeat these steps for each bitrate and segment. In some embodiments, however, the system can encode the segments at multiple bitrates in parallel, which can reduce the latency of the process.

Figure 8:
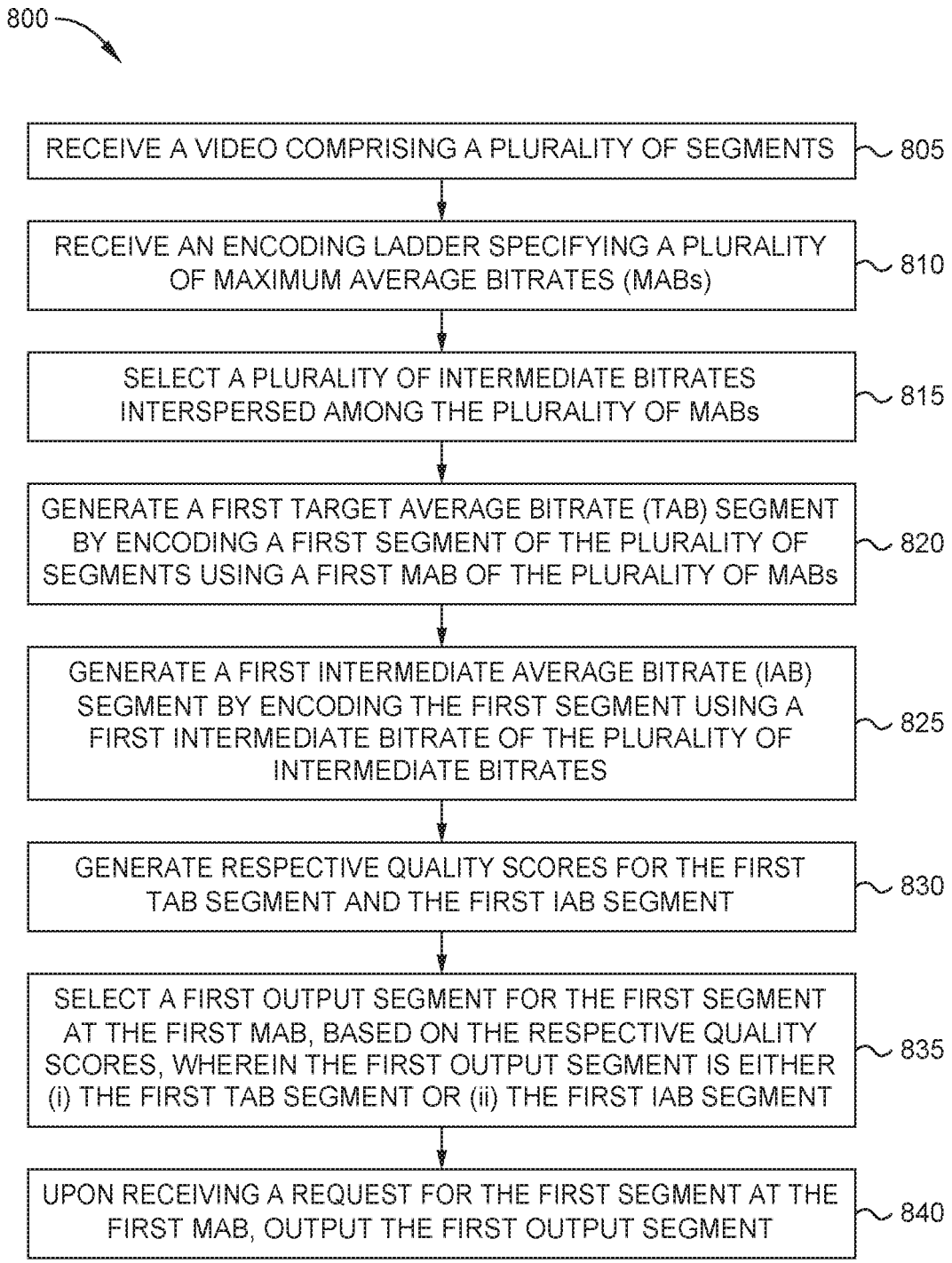
FIG. 8 is a flow diagram illustrating a method for segment quality-guided adaptive stream generation, according to some embodiments disclosed herein.

FIG. 8 is a flow diagram illustrating a method for segment quality-guided adaptive stream generation, according to some embodiments disclosed herein. The method 800 begins at block 805, where a streaming system receives a video comprising a plurality of segments. At block 810, the streaming system receives an encoding ladder specifying a plurality of maximum average bitrates (MABs). Further, at block 815, the streaming system selects a plurality of intermediate bitrates interspersed among the plurality of MABs. The method 800 then continues to block 820, where the streaming system generates a first target average bitrate (TAB) segment by encoding a first segment of the plurality of segments using a first MAB of the plurality of MABs. At block 825, the streaming system generates a first intermediate average bitrate (IAB) segment by encoding the first segment using a first intermediate bitrate of the plurality of intermediate bitrates. Additionally, at block 830, the streaming system generates respective quality scores for the first TAB segment and the first IAB segment. The method 800 then proceeds to block 835, there the streaming system selects a first output segment for the first segment at the first MAB, based on the respective quality scores, wherein the first output segment is either (i) the first TAB segment or (ii) the first IAB segment. At block 840, upon receiving a request for the first segment at the first MAB, the streaming system outputs the first output segment.

Figure 9:
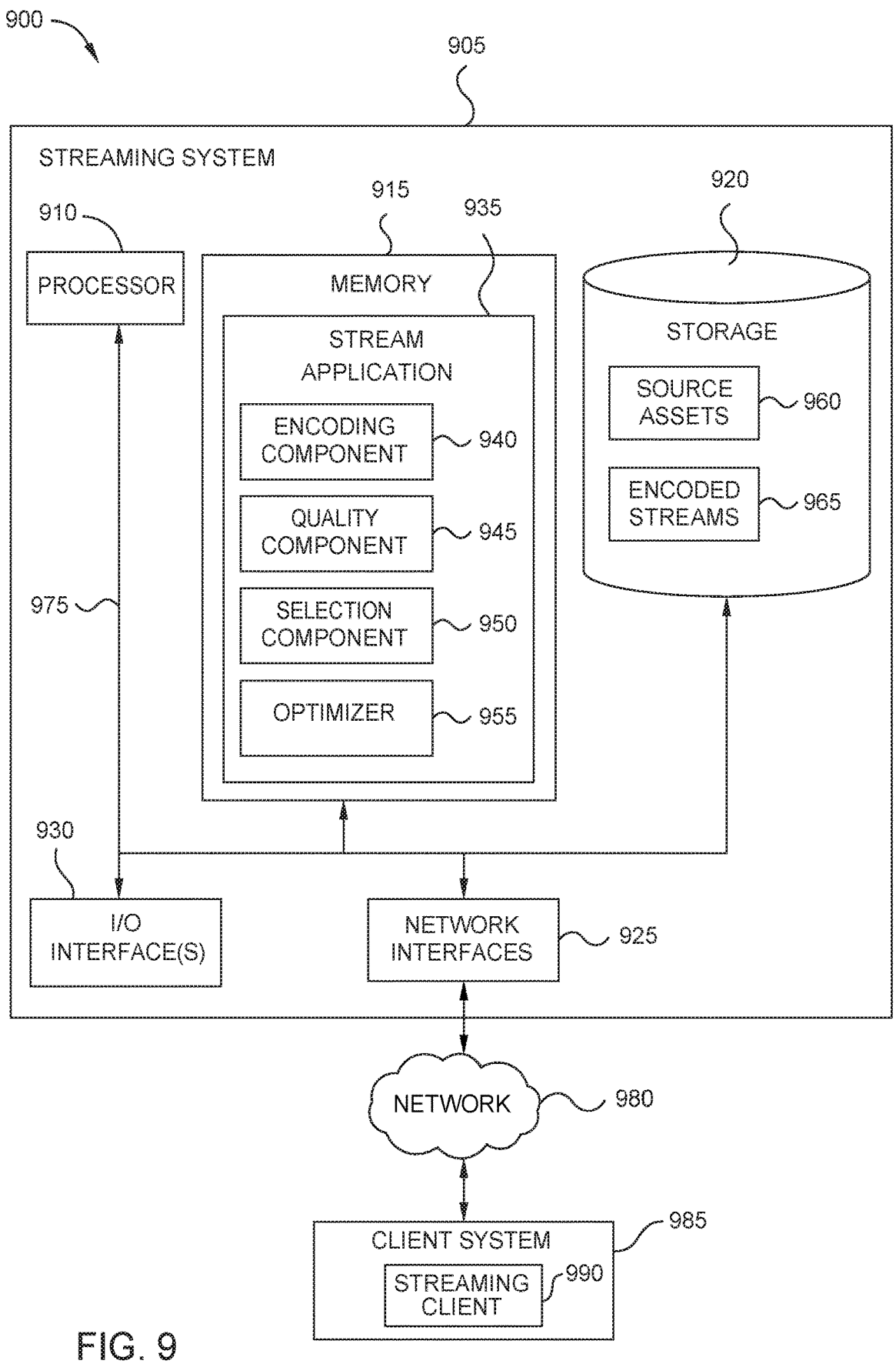
FIG. 9 depicts a streaming system configured to provide segment quality-guided adaptive streams, according to one embodiment disclosed herein.

FIG. 9 depicts a Streaming System 905 configured to provide segment quality-guided adaptive streams, according to one embodiment disclosed herein. Although depicted as a physical device, in embodiments, the Streaming System 905 may be implemented as a virtual device or service, or across a number of devices (e.g., in a cloud environment). As illustrated, the Streaming System 905 includes a Processor 910, Memory 915, Storage 920, a Network Interface 925, and one or more I/O Interfaces 930. In the illustrated embodiment, the Processor 910 retrieves and executes programming instructions stored in Memory 915, as well as stores and retrieves application data residing in Storage 920. The Processor 910 is generally representative of a single CPU, GPU, CPU and GPU, multiple CPUs, multiple GPUs, a single CPU or GPU having multiple processing cores, and the like. The Memory 915 is generally included to be representative of a random access memory. Storage 920 may be any combination of disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 930. Further, via the Network Interface 925, the Streaming System 905 can be communicatively coupled with one or more other devices and components (e.g., directly or via the Network 980, which may include the Internet, local network(s), and the like). Additionally, the Network 980 may include wired connections, wireless connections, or a combination of wired and wireless connections. As illustrated, the Processor 910, Memory 915, Storage 920, Network Interface(s) 925, and I/O Interface(s) 930 are communicatively coupled by one or more Buses 975. In embodiments, the Streaming System 905 may be implemented as a standalone device, as part of a cloud deployment, as an application executing on a user's phone or computer, and the like.

In the illustrated embodiment, the Storage 920 includes one or more Source Assets 960 and one or more corresponding Encoded Streams 965. Although depicted as residing in Storage 920, the Source Assets 960 and Encoded Streams 965 may be stored in any suitable location. In an embodiment, the Source Assets 960 are video, audio, or multimedia content that is capable of being encoded and streamed, as discussed above. The Encoded Streams 965 are generally encoded versions of the Source Assets 960. In some embodiments, as discussed above, each Encoded Stream 965 is associated with a corresponding MAB. Further, in some embodiments, a single Source Asset 960 may be associated with any number of corresponding Encoded Streams 965 (e.g., at different MABs). As discussed above, in an embodiment, each Encoded Stream 965 is generated to include a sequence of segments encoded at or below the MAB of the Encoded Stream 965. In some embodiments, the Encoded Streams 965 may utilize pointers to shared/overlapping common segments, as discussed above.

In the illustrated embodiment, the Memory 915 includes a Stream Application 935. The Stream Application 935 is generally configured to perform one or more of the embodiments discussed herein. Although depicted as software residing in Memory 915, in embodiments, the functionality of the Stream Application 935 may be implemented using software, hardware, or a combination of software and hardware. As illustrated, the Stream Application 935 includes an Encoding Component 940, a Quality Component 945, a Selection Component 950, and an Optimizer 955. Although depicted as discrete components for conceptual clarity, in embodiments, the operations of the Encoding Component 940, Quality Component 945, Selection Component 950, and Optimizer 955 may be combined or distributed across any number of components and devices.

In an embodiment, the Encoding Component 940 is configured to receive Source Assets 960 and encode each segment at one or more bitrates to generate a set of encoded segments for the Source Asset 960. As discussed above, in some embodiments, the Encoding Component 940 generates separate encoded variants of each source segment at each available bitrate (e.g., at each TAB and IAB). These variants can then be subsequently analyzed in order to construct optimized Encoded Streams 965.

The Quality Component 945 is generally configured to evaluate the visual quality of each encoded segment generated by the Encoding Component 945. To do so, the Quality Component 945 may use any number and combination of visual quality algorithms. In an embodiment, the Quality Component 945 generates a quality score for each encoded segment based on this analysis. This quality score may be a single value, or a composite set of values.

In the illustrated embodiment, the Selection Component 950 is configured to select, for each segment of each Encoded Stream 965, the best encoded segment. In embodiments, the Selection Component 950 does so based in part on the generated quality scores. In some embodiments, as discussed above, the Selection Component 950 does so by identifying a pool of potential encoded segments (at the MAB of the Encoded Stream 965) for each segment in the Source Asset 960. The Selection Component 950 can then select the encoded segment with the lowest bitrate, so long as this segment is associated with a sufficient quality score. This process can be repeated until the entire Encoded Stream 965 is generated. The Selection Component 950 can then iteratively repeat the process for each MAB available for the Source Asset 960.

In some embodiments, the Optimizer 955 is generally configured to perform other optimizations, such as reducing duplication between Encoded Streams 965, as discussed above. To do so, the Optimizer 955 can identify shared encoded segments in different Encoded Streams 965, and replace one or more of them with a pointer to a single shared copy of the encoded segment. In some embodiments, the Optimizer 955 can also evaluate the Encoded Streams 965 available for a given Source Asset 960 in order to identify Encoded Streams 965 that are sufficiently similar (e.g., above a predefined threshold). Streams that are similar may be collapsed into a single Encoded Stream 965 (e.g., by deleting one or more of the similar Encoded Streams 965). In doing so, the Optimizer 955 can reduce the storage and transmission requirements of the Streaming System 905.

Although depicted as a component within the Stream Application 935, in some embodiments, the Optimizer 955 may be a standalone component in the system, or may operate as a set of one or more functions distributed in the system. For example, in one such embodiment, after the Stream Application 935 has generated and stored the TAB and IAB segments (e.g., in Storage 920 or in Memory 915), a separate Optimizer 955 (or set of Optimizers 955) may access and evaluate these stored segments (e.g., the data in Memory 915 or the files in Storage 920) and optimize them based on overlap and shared use, as discussed above.

In the illustrated embodiment, the Streaming System 905 can communicate with a Client System 985 via the Network 980. Although a single Client System 985 is depicted, there may of course be any number of Client Systems 985. The Client System 985 is generally representative of any computing device configured to receive data from the Streaming System 905 (e.g., Encoded Streams 965), including but not limited to smart phones, laptop computers, desktop computers, internet-connected gaming systems, tablets, televisions, and the like. The Client System 985 is depicted as including a Streaming Client 990. Although not included in the illustrated embodiment, the Client System 985 may generally include any number and variety of computing elements such as processors, storage, memory, interfaces, and the like.

In various embodiments, the Streaming Client 990 may be implemented using hardware, software, or a combination of hardware and software. In an embodiment, the Streaming Client 990 can be used to select one or more assets provided by the Streaming System 905. For example, a user may use the Streaming Client 990 to select which movie or show they wish to stream. In some embodiments, the Stream Application 935 then provides a set or list of the available MABs for the asset, and the Streaming Client 990 can select among them. In one embodiment, the Streaming Client 990 automatically selects a MAB (e.g., based on available bandwidth, local computing resources, and the like). In one such embodiment, the Streaming Client 990 can automatically and dynamically change the selected MAB during the stream, based on changing conditions (e.g., to request a lower MAB when available bandwidth decreases). In at least one embodiment, the user can manually select a MAB or quality, and lock the stream to this quality.

As discussed above, in some embodiments, the Stream Application 935 dynamically selects output segments which may or may not align with the bitrate requested by the Streaming Client 990. For example, even if the Streaming Client 990 requests an 8.5 Mb/s stream, the Stream Application 935 may dynamically provide segments at lower bitrates if doing so would not reduce the quality beyond a preconfigured threshold. This change can be format/protocol agnostic, and the Streaming Client 990 may be entirely unaware of the changing bitrates being utilized. Advantageously, the Streaming Client 990 therefore need not be reprogrammed or reconfigured to apply embodiments disclosed herein.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving a video comprising a plurality of segments;
    receiving an encoding ladder specifying a plurality of maximum average bitrates (MABs);
    selecting a plurality of intermediate bitrates interspersed among the plurality of MABs;
    generating a first target average bitrate (TAB) segment by encoding a first segment of the plurality of segments using a first MAB of the plurality of MABs;
    generating a first intermediate average bitrate (IAB) segment by encoding the first segment using a first intermediate bitrate of the plurality of intermediate bitrates, wherein the first intermediate bitrate is lower than the first MAB;
    generating a first quality score for the first TAB segment and a second quality score for the first IAB segment;
    selecting the first IAB segment as a first output segment for the first segment at the first MAB, based at least in part on determining that the second quality score is within a predefined tolerance of the first quality score; and
    upon receiving a request for the first segment at the first MAB, outputting the first output segment.

2. The method of claim 1, the method further comprising:
    selecting, for the first segment at a second MAB of the plurality of MABs, the first output segment; and
    upon determining that the first output segment is used for both the first segment at the first MAB and the first segment at the second MAB:
        storing a shared copy of the first output segment; and
        associating the first segment at the first MAB and the first segment at the second MAB with the shared copy of the first output segment.

3. The method of claim 1, the method further comprising:
    selecting, for the first MAB, a first sequence of output segments corresponding to the plurality of segments;
    selecting, for a second MAB of the plurality of MABs, a second sequence of output segments corresponding to the plurality of segments; and
    upon determining that the first sequence of output segments is within a predefined threshold difference from the second sequence of output segments, eliminating either the first MAB or the second MAB.

4. The method of claim 1, wherein the generating the respective quality score for the first TAB segment comprises evaluating the first TAB segment using one or more objective quality algorithms configured to evaluate visual quality of the first TAB segment.

5. The method of claim 1, the method further comprising:
    determining, for the first segment at the first MAB, a pool of potential segments comprising the first TAB segment, one or more additional TAB segments encoded at bitrates below the first MAB, and one or more IAB segments encoded at bitrates below the first MAB, wherein selecting the first output segment for the first segment at the first MAB comprises selecting a segment from the pool of potential segments.

6. The method of claim 5, wherein selecting the first output segment for the first segment at the first MAB comprises:
    identifying a lowest bitrate segment in the pool of potential segments, wherein the lowest bitrate segment is associated with a quality score within the predefined tolerance of the first quality score.

7. The method of claim 1, the method further comprising:
    selecting, for the first MAB, a sequence of output segments corresponding to the plurality of segments, wherein each output segment in the sequence of output segments is encoded at a bitrate that is equal to or lower than the first MAB; and
    upon receiving a request for the video at the first MAB, outputting the sequence of output segments.

8. The method of claim 1, wherein the encoding ladder is a content-specific encoding ladder selected based on a type of the video.

9. A system, comprising:
    one or more computer processors; and
    a memory containing a program which when executed by the one or more computer processors performs an operation, the operation comprising:
        receiving a video comprising a plurality of segments;
        receiving an encoding ladder specifying a plurality of maximum average bitrates (MABs);
        selecting a plurality of intermediate bitrates interspersed among the plurality of MABs;
        generating a first target average bitrate (TAB) segment by encoding a first segment of the plurality of segments using a first MAB of the plurality of MABs;
        generating a first intermediate average bitrate (IAB) segment by encoding the first segment using a first intermediate bitrate of the plurality of intermediate bitrates, wherein the first intermediate bitrate is lower than the first MAB;
        generating a first quality score for the first TAB segment and a second quality score for the first IAB segment;
        selecting the first IAB segment as a first output segment for the first segment at the first MAB, based at least in part on determining that the second quality score is within a predefined tolerance of the first quality score; and
        upon receiving a request for the first segment at the first MAB, outputting the first output segment.

10. The system of claim 9, the operation further comprising:
    selecting, for the first segment at a second MAB of the plurality of MABs, the first output segment; and
    upon determining that the first output segment is used for both the first segment at the first MAB and the first segment at the second MAB:
        storing a shared copy of the first output segment; and
        associating the first segment at the first MAB and the first segment at the second MAB with the shared copy of the first output segment.

11. The system of claim 9, the operation further comprising:
    selecting, for the first MAB, a first sequence of output segments corresponding to the plurality of segments;
    selecting, for a second MAB of the plurality of MABs, a second sequence of output segments corresponding to the plurality of segments; and
    upon determining that the first sequence of output segments is within a predefined threshold difference from the second sequence of output segments, eliminating either the first MAB or the second MAB.

12. The system of claim 9, the operation further comprising:
determining, for the first segment at the first MAB, a pool of potential segments comprising the first TAB segment, one or more additional TAB segments encoded at bitrates below the first MAB, and one or more IAB segments encoded at bitrates below the first MAB, wherein selecting the first output segment for the first segment at the first MAB comprises selecting a segment from the pool of potential segments.

13. The system of claim 12, wherein selecting the first output segment for the first segment at the first MAB comprises:
identifying a lowest bitrate segment in the pool of potential segments, wherein the lowest bitrate segment is associated with a quality score within the predefined tolerance of the first quality score.

14. The system of claim 9, the operation further comprising:
selecting, for the first MAB, a sequence of output segments corresponding to the plurality of segments, wherein each output segment in the sequence of output segments is encoded at a bitrate that is equal to or lower than the first MAB; and
upon receiving a request for the video at the first MAB, outputting the sequence of output segments.

15. A method comprising:
receiving a video comprising a plurality of segments;
receiving an encoding ladder specifying a plurality of maximum average bitrates (MABs);
selecting a plurality of intermediate bitrates interspersed among the plurality of MABs;
generating a first target average bitrate (TAB) segment by encoding a first segment of the plurality of segments using a first MAB of the plurality of MABs;
generating a first intermediate average bitrate (IAB) segment by encoding the first segment using a first intermediate bitrate of the plurality of intermediate bitrates;
generating respective quality scores for the first TAB segment and the first IAB segment;
selecting a first output segment for the first segment at the first MAB, based on the respective quality scores, wherein the first output segment is either (i) the first TAB segment or (ii) the first IAB segment;
selecting, for the first segment at a second MAB of the plurality of MABs, the first output segment;
upon determining that the first output segment is used for both the first segment at the first MAB and the first segment at the second MAB:
storing a shared copy of the first output segment; and
associating the first segment at the first MAB and the first segment at the second MAB with the shared copy of the first output segment; and
upon receiving a request for the first segment at the first MAB, outputting the first output segment.

16. The method of claim 15, further comprising:
selecting, for the first MAB, a first sequence of output segments corresponding to the plurality of segments;
selecting, for the second MAB of the plurality of MABs, a second sequence of output segments corresponding to the plurality of segments; and
upon determining that the first sequence of output segments is within a predefined threshold difference from the second sequence of output segments, eliminating either the first MAB or the second MAB.

17. The method of claim 15, wherein the generating the respective quality score for the first TAB segment comprises evaluating the first TAB segment using one or more objective quality algorithms configured to evaluate visual quality of the first TAB segment.

18. The method of claim 15, further comprising:
determining, for the first segment at the first MAB, a pool of potential segments comprising the first TAB segment, one or more additional TAB segments encoded at bitrates below the first MAB, and one or more IAB segments encoded at bitrates below the first MAB, wherein selecting the first output segment for the first segment at the first MAB comprises selecting a segment from the pool of potential segments.

19. The method of claim 18, wherein selecting the first output segment for the first segment at the first MAB comprises:
identifying a lowest bitrate segment in the pool of potential segments, wherein the lowest bitrate segment is associated with a quality score within a predefined tolerance of a quality score associated with the first TAB segment.

20. The method of claim 15, further comprising:
selecting, for the first MAB, a sequence of output segments corresponding to the plurality of segments, wherein each output segment in the sequence of output segments is encoded at a bitrate that is equal to or lower than the first MAB; and
upon receiving a request for the video at the first MAB, outputting the sequence of output segments.

* * * * *